Figure 1:
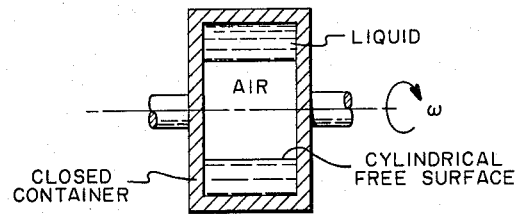

July 5, 1966 W. G. WING 3,258,975
FREE SURFACE ACCELEROMETER
Filed Aug. 27, 1963 2 Sheets-Sheet 1

INVENTOR.
WILLIS G. WING
BY
ATTORNEY

July 5, 1966 W. G. WING 3,258,975
FREE SURFACE ACCELEROMETER
Filed Aug. 27, 1963 2 Sheets-Sheet 2

INVENTOR.
WILLIS G. WING
BY
ATTORNEY

United States Patent Office 3,258,975
Patented July 5, 1966

3,258,975
FREE SURFACE ACCELEROMETER
Willis G. Wing, Glen Head, N.Y., assignor to Sperry Rand Corporation, Great Neck, N.Y., a corporation of Delaware
Filed Aug. 27, 1963, Ser. No. 304,764
6 Claims. (Cl. 73—516)

The present invention relates to acceleration responsive devices of the type known as linear inertial accelerometers and is an improvement over the accelerometer disclosed in U.S. Patent 3,028,760, issued April 10, 1962, to H. B. Diamond entitled, "Centrifugally Restrained Accelerometer."

The majority of prior art accelerometers of the inertial type utilize resiliently restrained inertial masses which introduce flexure of mechanical elements that have limited threshold characteristics and unduly long response time. Further, they usually include friction generating means which further limit the capabilities and accuracy of the acceleration sensing apparatus.

Prior art substitutions of a liquid as the inertial mass such as in manometric accelerometers result in accelerometers having relatively non-linear outputs and unduly long response times with comparatively slow recovery thereby rendering them unsuitable for applications where extreme rapid response and high accuracy are mandatory.

The present invention is an improvement over that described in said U.S. Patent 3,028,760 primarily in that it provides a measure of the acceleration experienced by the apparatus with respect to a plurality of mutually orthogonal axes instead of only one axis.

It is a primary object of the present invention to provide a free surface fluid acceleration responsive device which provides a measure of the acceleration experienced thereby with respect to three mutually perpendicular axes.

It is an additional object of the present invention to provide a multiple axis acceleration responsive device that is extremely accurate and utilizes distinguishable characteristics of a free surface fluid to define acceleration components with respect to predetermined axes.

It is a further object of the present invention to provide a free surface fluid accelerometer to provide signals representative of accelerations experienced perpendicular to a predetermined axis at very low threshold levels.

The above objects are accomplished by providing a spinning enclosure filled with two dielectric indissoluble fluids of substantially different densities. The cylinder is spun about its longitudinal axis in order that the higher density fluid which only partially fills the enclosure forms a cylindrical void about the spin axis under zero acceleration. The centrifuge action in a zero-$g$ field maintains the free surface of the high density fluid in a cylindrical form concentric with the spin axis. Under the influence of an acceleration along the spin axis, the cylindrical fluid-void boundary changes in shape to the form of a frustum of a paraboloid. Under the influence of accelerations perpendicular to the spin axis, the fluid-void boundary will assume an eccentric position with respect to the container spin axis. By means of suitable pick-offs at the ends of the enclosure, the eccentricity or deviation of the fluid-void boundary with respect to the container spin axis as well as the change in area due to the paraboloid shape are readily detectable to provide signals representative of acceleration components with respect to three mutually perpendicular axes.

Figure 3:
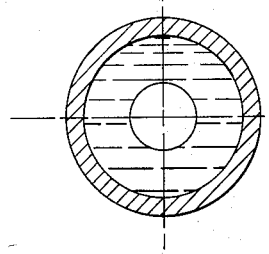
Figure 2:
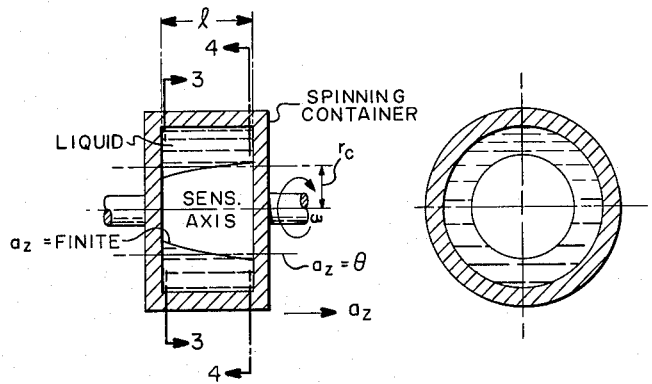
Figure 4:
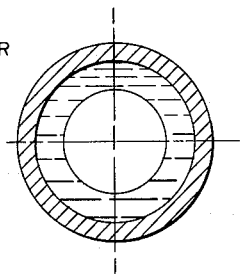
Figure 5:
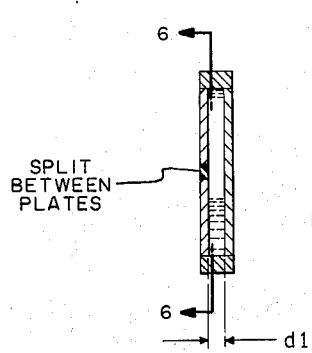
Figure 6:
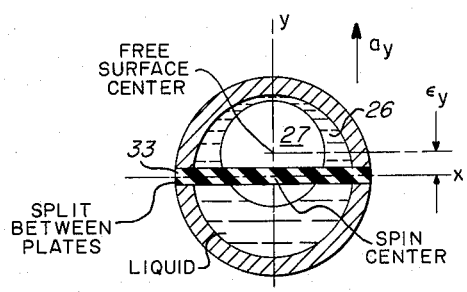
Figure 7:
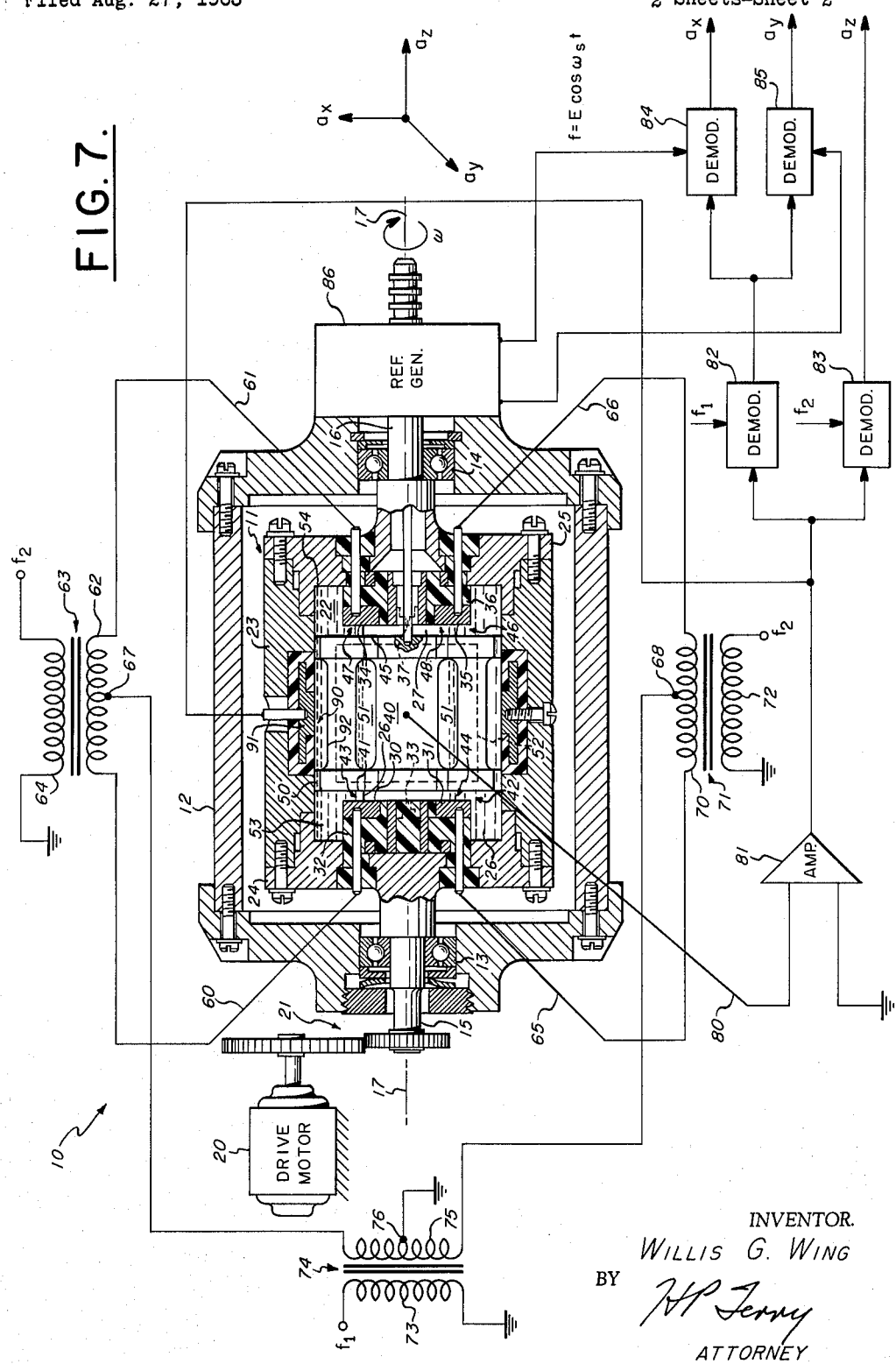

Referring to the drawings,

FIG. 1 is a schematic cross-sectional view of a cylindrical enclosure containing a free surface high density dielectric fluid in a zero-$g$ field, FIG. 2 is a view of the apparatus of FIG. 1 experiencing an acceleration along the spin axis, FIG. 3 is a view taken along the lines 3—3 of FIG. 2, FIG. 4 is a view taken along the lines 4—4 of FIG. 2, FIG. 5 is a view of a portion of FIG. 1 experiencing an acceleration perpendicular to the spin axis in the vertical direction, FIG. 6 is a view taken along the lines 6—6 of FIG. 5, and FIG. 7 is a schematic view partly in section of an accelerometer incorporating the present invention.

The present invention is based upon the response of the free surface of a liquid constrained in a spinning enclosure. As shown in FIG. 1, a closed cylinder partially filled with a liquid when spun about its longitudinal axis creates a cylindrical void about the spin axis defined by the inner free surface of the liquid. In the absence of accelerations, the inner fluid boundary defines a circle in any plane through the container normal to the spin axis. Two such planes are formed by the end plates of the container.

As shown in FIG. 2, and as more fully described in said U.S. Patent 3,028,760, when the container is subjected to an acceleration along its spin axis, the inner fluid boundary or free surface takes the form of a frustum of a paraboloid. Thus, with an acceleration to the right along the spin axis $z$ as viewed in FIG. 2, the area defined by the void will be decreased at the left end of the enclosure as shown in FIG. 3 while as shown in FIG. 4 it will be increased on the right end of the enclosure. Thus, the circles lying in the end planes defined by the end plates of the container exhibit an area change proportional to the axially applied acceleration.

This may be formulated as follows:

$$A_B - A_A = \frac{2\pi l a_z}{\omega^2} \tag{1}$$

$a_z$ = applied acceleration along the spin axis
$A_B - A_A$ = difference in end-circle areas
$l$ = container length
$\omega$ = container spin rate For linear operation the limiting value of input acceleration, $a_{z_{max}}$, along the spin axis is $$a_{z_{max}} = \frac{r_c^2 \omega^2}{l} \tag{2}$$

where
$r_c$ = inner radius of the fluid circle formed under the condition of zero $g$.

For accelerations greater than $a_{z_{max}}$, the circular end area will close in one end space, and the relationship between acceleration and area change will no longer be linear.

Reference to Equation 1 above indicates that sensitivity, i.e., the end area change per $g$, is independent of fluid density and therefore does not require temperature control. The specific centrifugal force does act on fluid density to constrain the body to a cylindrical shape, but the axial applied acceleration also acts through the fluid density to cause the parabolic distortion. Since both forces act on the same fluid density parameter, the result is a constant ratio independent of the particular density value although density changes with temperature.

The fluid free-surface is also used in the present invention to detect acceleration components along the two perpendicular axes $x$ and $y$ which are also perpendicular to the spin axis $z$ of the container. To determine this cross-axis sensing it is necessary to consider only an infinitesmal length along the container spin axis $z$ as shown in FIG. 5. If there are no acceleration components in the direction of the $x$ or $y$ axes, the inner circle of the liquid annulus, i.e., the fluid free surface, is concentric with the spin axis of the container as shown in FIG. 1 and the centrifugal acceleration vector through any particle of liquid along the inner circle is normal to the free surface.

If an acceleration is applied along an axis normal to the spin axis, for example, an acceleration $a_y$ in a direction vertically upward along the $y$ axis as shown in FIG. 6, every particle of liquid will experience this same acceleration. Thus, for the liquid along the inner circle, the vector sum of centrifugal and inertial input accelerations will no longer be normal to the free surface at every point around the circle. As shown in FIG. 6, the free surface will therefore be caused to translate along the direction of input acceleration. The magnitude of the translation or eccentricity is just sufficient to insure that the vector sum of the impressed accelerations is once again normal to the free surface.

The eccentricity, $E_x$, in response to an acceleration along the $x$ axis may be expressed as, $$E_x = \frac{a_x}{\omega^2} \quad (3)$$

and similarly with respect to the $y$ axis, $$E_y = \frac{a_y}{\omega^2} \quad (4)$$

where $a_x$ and $a_y$ are the cross-axis acceleration components.

Sensitivity in this instance, i.e., eccentricity per $g$, is also found to be independent of fluid density. By using a dielectric liquid, a capacitive pick-off can accurately measure the area change of the end plate circles to provide an output signal proportional to the acceleration component acting along the spin axis $z$. By employing split ring capacitor plates as shown in FIGS. 5 and 6, the pick-off also accurately measures the cross-axis translation or eccentricity of the liquid area due to cross-axis acceleration in a manner to be more fully described with respect to FIG. 7.

Referring now to FIG. 7, a three axis free surface accelerometer 10 is shown which operates on the principles explained above. The accelerometer 10 comprises a rotor assembly 11 that is rotatably supported within an outer housing 12 on spaced bearings 13 and 14 by means of oppositely extending shafts 15 and 16. The rotor assembly 11 is spun about its longitudinal or spin axis 17 by means of a drive motor 20 through gearing 21.

The rotor assembly 11 includes a hermetically sealed cylindrical enclosure 22 formed by an aluminum tubular member 23 and two circular aluminum end pieces 24 and 25. The enclosure 22 is partially filled with a liquid 26 which under conditions of rotation distributes itself about the periphery of the enclosure 22 due to centrifugal forces. Preferably, the liquid 26 also has a relatively high dielectric constant with respect to the low density fluid 27 which fills the remainder of the enclosure 22. A suitable combination, for example, has been found to be a #200 Dow Corning silicone having a dielectric constant of 2.63 as the fluid 26 while air having a dielectric constant of 1 is suitable for the fluid 27. The end pieces 24 and 25 are connected to the shafts 15 and 16, respectively, about which the assembly 11 rotates.

Semi-circular electrically conductive plates 30 and 31 are mounted on a non-conductive circular projection 32 of the end piece 24 in the manner described with respect to FIGS. 5 and 6, and are spaced with respect to each other by means of a split 33 between the plates 30 and 31. Similarly, semi-circular electrically conductive plates 34 and 35 are mounted on a non-conductive projection 36 of the end piece 25 and are spaced with respect to each other by means of a split 37. The plates 30, 31, 34 and 35 are symmetrically arranged with the plate 30 axially opposed to the plate 34 and the plate 31 opposed to the plate 35 and in axially spaced relation to permit a common output spool member 40 to be disposed therebetween within the enclosure 22. The member 40 is secured to the rotor assembly 11 by means of a shrink fit or other suitable means and generally has the configuration of a hollow H-shaped spool. The spool member 40 is electrically conductive and has a circular end plate 41 that is cooperative with and spaced from the semi-circular plates 30 and 31 to form a variable capacitor 42 having a top portion 43 consisting of the plate 30 and the end plate 41 and a bottom portion 44 consisting of the plate 31 and the end plate 41. Similarly, the other end plate 45 of the spool member 40 is cooperative with the semi-circular plates 34 and 35 to provide another variable capacitor 46. The variable capacitor 46 has a top portion 47 comprising the plate 34 and the end plate 45 and a bottom portion 48 comprising the plate 35 and the end plate 45. The variable capacitors 42 and 46 are arranged such that in the absence of accelerations their capacitive characteristics are identical.

The spool member 40 has a plurality of axially and radially disposed apertures 50 and 51, respectively, symmetrically arranged to permit fluid flow through the spool member 40 in axial and radial directions. Further, the spool member 40 is hollow as indicated by the dotted lines to provide an expansion chamber 52 for the liquid 26 thereby eliminating bellows or other expansion devices.

It will be noted that the distance between the respective plates of the variable capacitors 42 and 46 is kept small in the axial direction while preferably the projection 32 and the end plate 41 as well as the enclosure 22 define a relatively large annulus 53 of liquid 26. Similarly, the enclosure 22, the projection 36 and the end plate 45 define a large annulus 54 of liquid 26 with respect to the relatively small amount contained between the end plate 45 and the plates 34 and 35. During rotation of the rotor assembly 11 this permits the majority of the liquid 26 to be rotated in the annuli 53 and 54 with relatively little being rotated between the plates of the variable capacitors 42 and 46, thereby compensating for phase lag which would otherwise occur in a manner more fully explained.

To provide output signals representative of acceleration components with respect to the $x$, $y$, and $z$ axes, as indicated by the mutually orthogonal arrows of FIG. 7, the capacitors 42 and 46 are utilized in capacitive bridge circuits. Thus, the top plates 30 and 34 are connected by means of leads 60 and 61, respectively, to opposite ends of the secondary 62 of a transformer 63 which has its primary 64 connected to a carrier frequency source having a frequency $f_2$. Similarly, the bottom plates 31 and 35 are connected by respective leads 65 and 66 to opposite ends of the secondary 70 of a transformer 71 which has its primary 72 also connected to the carrier frequency source $f_2$. To distinguish between axial accelerations in the direction of the $z$ axis and cross-accelerations in the directions of the $x$ or $y$ axes when using a common output member 40, a substantially different carrier frequency source having a frequency $f_1$ is connected to the primary 73 of another transformer 74 which has the ends of its secondary 75 connected to the center taps 67 and 68 of the secondaries 62 and 70, respectively. The center tap 76 of the secondary 75 is connected to ground potential. The transformers 63, 71, and 74 are shown disposed external to the rotor assembly 11 for ease of explanation. In practice, they may be mounted thereon in order to avoid slip ring connections or alternatively may be disposed fixed to the housing 12 utilizing conventional slip ring techniques.

A common output lead 80 connects the common output spool member 40 to an isolation amplifier 81. The amplifier 81 is connected to demodulators 82 and 83 which are responsive to the carrier frequencies $f_1$ and $f_2$, respectively. The demodulator 83 provides an output signal representative of the acceleration experienced by the accelerometer 10 along the $z$ or spin axis 17 in a manner to be more fully described. The demodulator 82 is connected to demodulators 84 and 85. A reference generator 86 mounted on the shaft 16 provides a rotor speed reference signal $E \cos \omega_s t$ where the signal frequency $\omega_s$ is representative of rotor shaft speed. This signal is connected to demodulator 84 in order that the latter provides a signal representative of the acceleration experienced along the $x$ axis. The reference generator 86 also provides a rotor speed reference signal $E \sin \omega_s t$ to the demodulator 85 in order that the latter provides a signal representative of the acceleration experienced along the $y$ axis.

The pick-off circuit described immediately above utilizes an additional internal capacitor 90 which acts as a feedback element around the isolation amplifier 81 primarily to provide amplifier gain stability. Thus, the amplifier 81 is connected to a circular plate 91 which is cooperative with the circumference 92 of the spool member 40 to form the capacitor 90.

In operation, as the rotor assembly 11 spins about its axis 17 the liquid 26 by means of viscous drag and centrifugal forces distributes itself evenly about the periphery of the enclosure 22. Under conditions of zero acceleration, the centrifugally restrained inner surface 92 of the liquid 26 assumes the shape of a hollow cylinder with equal liquid areas in the space between the capacitors 42 and 46, as explained schematically with respect to FIG. 1. In response to accelerations along the $z$ or spin axis 17, the circular liquid area will increase in one end with respect to one capacitor and decrease in the other with respect to the other capacitor, as explained with respect to FIGS. 2–4 and in a manner more fully disclosed in said U.S. Patent 3,028,760. The net area change is proportional to the applied axial acceleration. Cross-axis accelerations, i.e., perpendicular to the $z$ axis, tend to eccentrically position the end circles within their spaces between the capacitors 42 and 46 as described with respect to FIGS. 5 and 6.

The pick-off signal from the common output spool member 40 is a measure of the difference in the capacitance established in the capacitors 42 and 46 as a function of a parallel combination of air gap and liquid gap capacitances. Under zero "g" input conditions, i.e., centered circles with respect to the capacitors 42 and 46, the capacitance values established between each excitation plate and the member 40 are nominally equal providing a zero output from the bridge network circuits.

A distortion of the free surface 92 results in a relative liquid with respect to air area change with a resultant bridge unbalance that produces a carrier voltage output from the output member 40 to the amplifier 81. This carrier voltage output has an amplitude and phase proportional to the instantaneous displacement (or area change) of the circle along the reference axis under consideration and the direction thereof respectively. In order to obtain components of acceleration with respect to the three axes $x$, $y$, and $z$ when utilizing a common output member 40, the signal from the amplifier 81 is first demodulated with reference to each carrier excitation frequency $f_1$ and $f_2$ in demodulators 82 and 83 respectively. Then, with respect to axes $x$ and $y$, the signal must be demodulated with respect to the rotor assembly spin frequency by means of the quadrature components of the voltage from the two phase reference generator 86. The output of the demodulator 84 is then a signal having a magnitude and polarity representative of the amount and direction respectively of the acceleration component along the $x$ axis while the output of the demodulator 85 has a magnitude and polarity representative of the amount and direction respectively of the acceleration component experienced along the $y$ axis.

It will be appreciated that the present invention is equally suitable for detecting only accelerations perpendicular to a predetermined axis in which event a capacitor having a pair of plates disposed at the center of the enclosure would suffice.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. In apparatus for detecting accelerations along and perpendicular to a predetermined axis,
    (a) an enclosure filled with two mutually indissoluble fluids having substantially different densities, one of said fluids being substantially incompressible,
    (b) a pair of substantially parallel planes within said enclosure,
    (c) said predetermined axis passing perpendicularly through said planes,
    (d) means for centrifugally distributing said fluids about said axis to a degree sufficient to maintain the higher density fluid in contact with both said planes and away from said axis between the planes,
    (e) the internal surface of said higher density fluid normally defining a circle having a predetermined area with respect to said planes and having its center coincident with said axis in the absence of accelerations along or perpendicular to said axis, and
    (f) means for detecting the deviation from said predetermined area and translation of the center of said circle with respect to said axis to determine components of acceleration along and perpendicular to said axis.

2. In apparatus for detecting accelerations along and perpendicular to a predetermined axis,
    (a) an enclosure filled with two mutually indissoluble fluids having different densities and different dielectric constants, the fluid having the higher density also being substantially incompressible,
    (b) a pair of substantially parallel planes within said planes,
    (c) said predetermined axis passing perpendicularly through said planes,
    (d) means for centrifugally distributing said fluids about said axis to a degree sufficient to maintain the higher density fluid in contact with both said planes and away from said axis between the planes,
    (e) said parallel planes having disposed therein first and second capacitance means, respectively,
    (f) said higher density fluid normally defining a circle having a predetermined area with respect to said first and second capacitance means and having its center coincident with said axis in the absence of acceleration along and perpendicular to said axis, and
    (g) means including first and second capacitance means for detecting the deviation of the area from said predetermined area and the translation of the center of the circle with respect to said axis to determine components of acceleration along and perpendicular to said axis.

3. In apparatus of the character described in claim 2 in which said first capacitance means includes first and second semi-circular capacitance plates and said second capacitance means includes a circular capacitance plate cooperative with said first and second semi-circular capacitance plates.

4. An accelerometer for measuring magnitudes of acceleration along and perpendicular to a predetermined axis,
    (a) a substantially right cylindrical enclosure filled with a liquid and a gas having different densities and dielectric constants,
    (b) means for centrifugally distributing said fluids about the longitudinal axis of said enclosure to a degree sufficient to maintain the liquid in contact with both ends of said cylinder and away from said axis over its entire length, said longitudinal axis being coincident with said predetermined axis, (c) a first variable capacitor having first and second semi-circular plates mounted in one end of said enclosure on opposite sides of said axis and both cooperative with a third circular plate, (d) a second variable capacitor having third and fourth semi-circular plates mounted in the other end of said enclosure on opposite sides of said axis and both cooperative with a fourth circular plate, (e) said variable capacitors and said liquid normally being so arranged as to define a circle having a predetermined area with respect to said first and second and said third and fourth plates, respectively, and having its center coincident with said axis in the absence of acceleration, and (f) means connected to said first and second variable capacitors for detecting the deviation of the area with respect to said predetermined area and the translation of the center of the circle with respect to said axis to determine components of acceleration along and perpendicular to said axis, respectively.

5. In apparatus of the character described in claim 4 in which said variable capacitors and said liquid are so arranged that in the absence of accelerations along said axis the area defined by said liquid is equal with respect to said first and second variable capacitors while in the absence of accelerations perpendicular to said axis the area subtended by said circle with respect to said first plate is equal to that with respect to said second, third and fourth plates, respectively.

6. In apparatus of the character described in claim 4 in which said first and second circular plates form a common output element.

References Cited by the Examiner
UNITED STATES PATENTS

| | | | |
|---|---|---|---|
| 2,938,390 | 5/1960 | McFee | 73—516 |
| 3,028,760 | 4/1962 | Diamond | 73—516 |
| 3,029,644 | 4/1962 | Loveless et al. | 73—503 X |

RICHARD C. QUEISSER, *Primary Examiner.*

JAMES J. GILL, *Examiner.*